July 19, 1960
A. HOPPE
2,945,798
PROCESS FOR SEPARATING PARAFFIN WAX FROM
WAX-CONTAINING HYDROCARBON OILS
Filed May 25, 1956
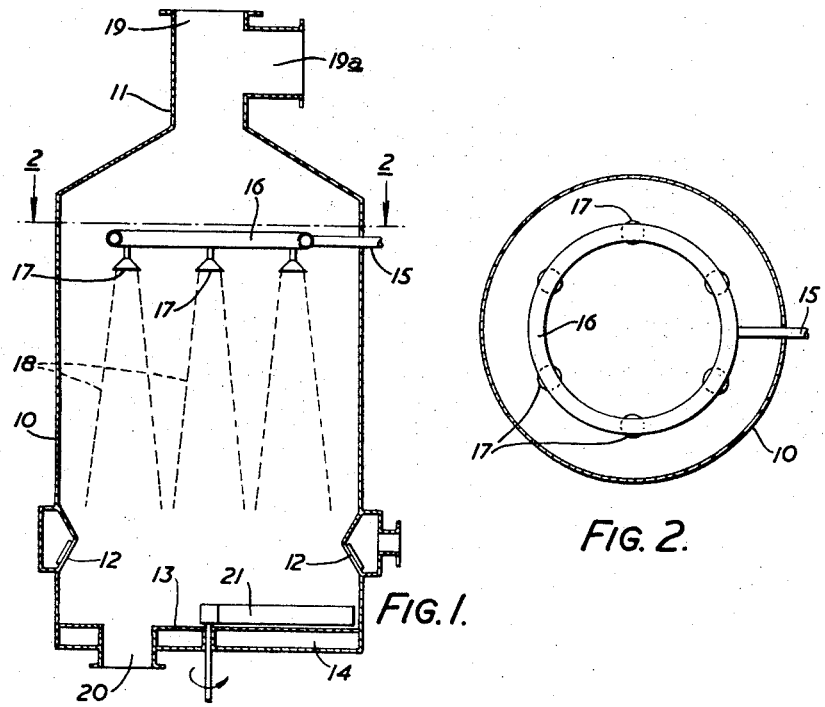
FIG. 1.
FIG. 2.
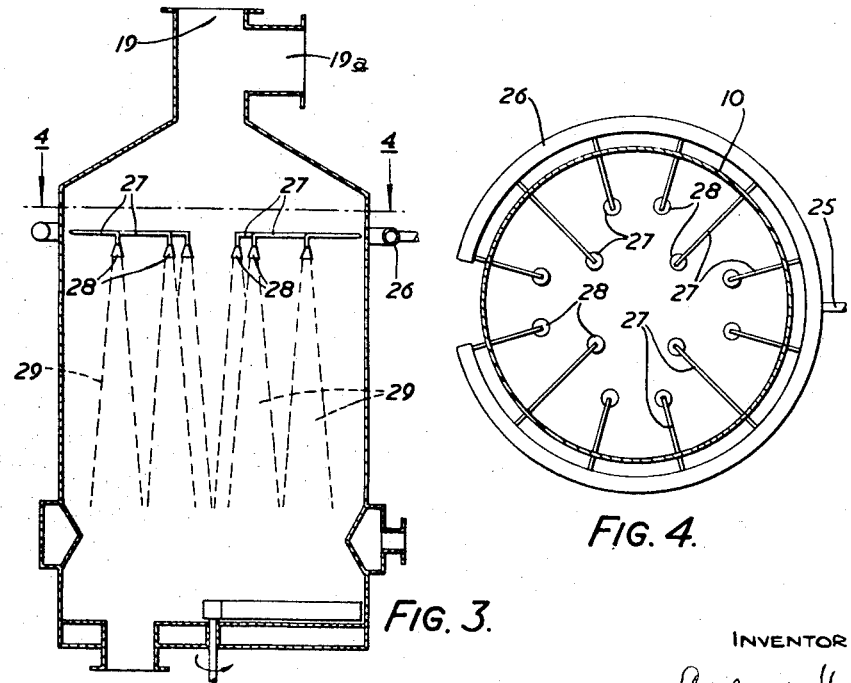
FIG. 3.
FIG. 4.
INVENTOR
BY Alfred Hoppe
ATTORNEYS 2,945,798

PROCESS FOR SEPARATING PARAFFIN WAX FROM WAX-CONTAINING HYDROCARBON OILS

Alfred Hoppe, Frankfurt am Main, Germany, assignor to Edeleanu Gesellschaft m.b.H., Frankfurt am Main, Germany, a body corporate of Germany Filed May 25, 1956, Ser. No. 587,326

Claims priority, application Germany May 27, 1955

2 Claims. (Cl. 208—28)

In United States application Serial No. 380,206, filed on September 15, 1953, is described a process and apparatus for separating paraffin wax from wax-containing hydrocarbon oils, wherein the wax-containing oil is sprayed at a temperature above its pour point into a stream of a cooling gaseous medium moving in countercurrent to the sprayed oil to yield a solid pulverulent product, which is subsequently mixed with a solvent at a temperature below the melting point of the wax, and the wax is then separated from the mixture. The wax-containing oil is sprayed by means of a distributing device, advantageously a nozzle, into a tower, in which the descending liquid particles are shock-cooled by the ascending gaseous medium, and thus converted into a granular material, the sensible heat and the heat of crystallization of the oil being taken up by the gas. The tower has an inlet in its lower part for the gaseous medium and an outlet for the gaseous medium above the spraying nozzle.

In carrying out this process it has been found that a part of the ascending gas, which has taken up heat, does not pass away directly through the space above the nozzle, but is sucked down and whirled round owing to the injector action of the spraying nozzle, so that the cold gas entering at the bottom of the tower is prematurely heated by mixing with the gas sucked downwardly. This reduces the efficiency of the heat exchange between the ascending cold gas and the descending warm drops of oil.

This effect is especially disadvantageous when air is used as the gaseous cooling medium and the air ascends solely due to the chimney-like action of the tower, i.e. without being impelled upwardly by a fan or similar device. If the heat exchange took place in the manner intended, the sprayed material in falling to the base of the tower would be cooled to approximately the inlet temperature of the air. However, owing to the injector action of the nozzle, there is a substantially greater difference between the temperature of the sprayed material and that of the air at this point. If the solidification point of the feed stock is comparatively low, the desired solidification may only be attained incompletely and the sprayed material will remain sticky (viscous) and agglomerate.

The present invention is based on the observation that the injector action of the spraying nozzle can be avoided, and the necessary normal heat exchange between the sprayed material and the ascending gas, can be attained, by spraying the oil with a plurality of nozlzes, instead of a single nozzle.

The quantity of material that can be sprayed by a nozzle depends upon the size of the nozzle opening and the pressure at which the material is supplied to it. If the desired throughput is to be sprayed by means of a single nozzle, the nozzle must have a corresponding diameter and be supplied at a certain high pressure. The diameter of the nozzle opening cannot be increased indefinitely, in view of the size of the particles it is required to produce. The jet of spray leaving the nozzle sucks the ascending heated gas downwardly and thus causes an undesirable circulation of the gas. The greater the injector action of the nozzle depending on the pressure, the greater is the quantity of air entrained by this circulation, and in this way the capacity of the spraying tower is diminished. When the material to be sprayed is distributed to a plurality of nozzles of a smaller diameter, the pressure can be reduced depending on the number of the nozzles and their diameter. In this manner the injector action is avoided, and the heated gas is able to flow upwardly unhindered.

The number of nozzles to be used is determined by the capacity of the spraying tower, which in turn depends on various factors, above all on the quantity of heat to be removed, and on the diameter of the tower and the speed of flow of the gas stream.

The manner in which the nozzles are arranged in the tower also depends on the number of the nozzles used.

The process and apparatus of the invention are exemplified with reference to the accompanying drawings, in which:

Fig. 1 shows in cross-sectional elevation one form of the apparatus,

Fig. 2 is a cross-section taken on the line 2—2 in Fig. 1,

Fig. 3 shows in cross-sectional elevation another form of the apparatus, and

Fig. 4 is a cross-section taken on the line 4—4 in Fig. 3.

Both forms of the apparatus shown in Figs. 1 to 4 comprise a tower 10 the upper part of which is narrowed to form a chimney 11, and having inlet openings 12 arranged round the circumference of the tower at the lower part thereof, a floor 13 at the base of the tower provided with a cooling jacket 14, a discharge outlet 20 in the floor 13, a scraper 21, and gas outlets 19 and 19a.

The parts of the apparatus described above are the same as those shown in the drawing of United States application Serial No. 380,206. In accordance with the present invention, as shown in Figs. 1 and 2, a supply conduit 15 for the oil-wax mixture to be treated communicates with an annular conduit 16 located with the upper part of the tower 10, and spraying nozzles 17 are mounted on the annular conduit at substantially equal distances from the wall of the tower 10.

In the form of the apparatus shown in Figs. 3 and 4 a supply conduit 25 supplies the oil-wax mixture to an annular conduit 26 located around and outside the upper part of the tower 10. Branch conduits 27 lead radially inward through the wall of the tower 10 to spraying nozzles 28 located within the upper part of the tower. The nozzles 28 are located at different distances from the wall of the tower, so that some of the nozzles are near the center of the tower and others near the wall of the tower. As shown in Fig. 3 all the nozzles are in the same cross-sectional plane of the tower, but, if desired, they may lie in different cross-sectional planes.

In both forms of the apparatus the nozzles 17 and 28, respectively, are so distributed that the spray cones 18 or 29, shown in broken lines, produced by adjacent nozzles do not intersect one another. In this manner agglomeration of the droplets of spray is avoided. This result can also be obtained by using a plurality of nozzles of alternately differing diameters.

The process is similar to that described in the aforesaid United States application Serial No. 380,206. Thus, an oil-wax mixture, for example, a wax-containing oil, is sprayed at a temperature above its pour point downwardly into the tower 10 from the nozzles 17 or 28. At the same time a gaseous medium, for example, air, is introduced through the inlet openings 12 so as to ascend through the tower 10 in countercurrent to the droplets of spray. The gaseous medium is at a temperature below the melting point of the oil-wax mixture, and to this end, if the external temperature and the melting point of the oil-wax mixture make it necessary, the gaseous medium is cooled in a cooling device before entering the tower.

When air is used the air may leave the tower 10 through the gas outlet 19 to be discharged into the atmosphere. Alternatively, if the air or other gaseous medium is to be re-used, for example, in order to save cooling energy, it is withdrawn through the outlet 19a by means of a blower and pumped through a cooling device back into the tower, as described in the aforesaid United States application.

The droplets of spray are solidified by the cooling action of the gaseous medium, so that the oil-wax mixture is deposited in the form of solid granular material on the floor 13. The granular material is discharged through the outlet 20, the discharge being assisted by the scraper 21. The granular material is treated to separate the wax therefrom in the manner described in the aforesaid United States application.

I claim:

1. A process for separating paraffin wax from a mixture of wax and a hydrocarbon oil, which comprises spraying an oil-wax mixture at a temperature above its pour point by means of a plurality of separate spraying nozzles downwardly in the upper part of a tower, and simultaneously causing cooling air to ascend through the finely divided particles of the sprayed mixture solely due to the chimney-like action of the tower, the said air stream having a temperature below the melting point of the oil-wax mixture to convert the sprayed particles into a solid granular material.

2. A process for separating paraffin wax from a mixture of wax and a hydrocarbon oil, which comprises spraying an oil-wax mixture at a temperature above its pour point downwardly in a tower by means of a plurality of separate spraying nozzles located in the upper part of the tower and so distributed over the cross section of the tower that the sprays coming from adjacent nozzles do not intersect one another, simultaneously causing a stream of cooling air to ascend through the finely divided particles of the sprayed mixture solely due to the chimney-like action of the tower, the said air stream having a temperature below the melting point of the oil-wax mixture to convert the sprayed particles into a solid granular material.

References Cited in the file of this patent

UNITED STATES PATENTS

| | | |
|---|---|---|
| 55,426 | Morehouse | June 5, 1866 |
| 1,277,935 | Hussey | Sept. 3, 1918 |
| 1,301,288 | MacLachlan | Apr. 22, 1919 |
| 1,797,055 | Douthitt | Mar. 17, 1931 |
| 2,001,700 | Barthel | May 21, 1935 |
| 2,116,144 | Dickinson | May 3, 1938 |
| 2,164,773 | Knowles | July 4, 1939 |
| 2,387,345 | Pearl | Oct. 23, 1945 |
| 2,585,779 | Janecek et al. | Feb. 12, 1952 |
| 2,858,903 | Goetz et al. | Nov. 4, 1958 |